(12) United States Patent
Foessel et al.

(10) Patent No.: US 8,364,366 B2
(45) Date of Patent: Jan. 29, 2013

(54) SYSTEM AND METHOD FOR PROVIDING A SAFETY ZONE ASSOCIATED WITH A VEHICLE

(75) Inventors: Alex Dietrich Foessel, Ranchos Palos Verdes, CA (US); Eric Derbez, Torrance, CA (US); Chad Alan Ackerman, Bettendorf, IA (US); Stewart Moorehead, Ranchos Palos Verdes, CA (US); Scott Adam Stephens, Phoenix, AZ (US); Jeffrey Scott Puhalla, Hawley, MN (US)

(73) Assignee: Deere & Company, Moline, IL (US)

( * ) Notice: Subject to any disclaimer, the term of this patent is extended or adjusted under 35 U.S.C. 154(b) by 56 days.

(21) Appl. No.: 11/166,873

(22) Filed: Jun. 24, 2005

(65) Prior Publication Data

US 2006/0293856 A1 Dec. 28, 2006

(51) Int. Cl.
*G06F 19/00* (2011.01)
*G05D 1/02* (2006.01)
*B62D 1/00* (2006.01)
*A01D 41/127* (2006.01)

(52) U.S. Cl. ......... 701/70; 701/301; 180/167; 56/10.2 R

(58) Field of Classification Search ................ 701/23, 701/28, 36, 70, 93, 96, 97, 98, 200, 223, 701/300, 301, 400, 408, 409, 532, 538, 1, 701/50; 340/901, 903, 904; 348/113, 118; 180/167, 169; 56/10.1, 10.2 R, 10.4, 10.2 D, 56/10.2 F, 10.2 G, 13.3, 13.4
See application file for complete search history.

(56) References Cited

U.S. PATENT DOCUMENTS

| | | | | |
|---|---|---|---|---|
| 4,208,658 | A | | 6/1980 | Fujiki et al. |
| 5,529,138 | A | * | 6/1996 | Shaw et al. .................. 180/169 |
| 5,572,449 | A | * | 11/1996 | Tang et al. .................. 700/304 |
| 5,631,639 | A | * | 5/1997 | Hibino et al. ................ 340/903 |
| 5,657,225 | A | * | 8/1997 | Bauer ............................ 701/23 |

(Continued)

FOREIGN PATENT DOCUMENTS

| DE | 31 21 684 A1 | 12/1982 |
|---|---|---|
| FR | 2 646 383 A1 | 11/1990 |

(Continued)

OTHER PUBLICATIONS

Thrun, S., and Bücken, A. Learning Maps for Indoor Mobile Robot Navigation [online], Apr. 1996 [retrieved on Jun. 24, 2005]. Retrieved from the Internet: <URL: http://www.ri.cmu.edu/pub _ files/publ/thrun_sebastian_1996_1/thrun_sebastian 1996_1pdf>.

(Continued)

*Primary Examiner* — Thomas Tarcza
*Assistant Examiner* — Edward Pipala
(74) *Attorney, Agent, or Firm* — Womble Carlyle

(57) ABSTRACT

A sensing system collects position data associated with one or more obstacles within a certain range of a vehicle. A former establishes an occupancy grid based on the collected position data. A motion monitoring module determines a reaction distance and a deceleration distance associated with a vehicle at a regular time interval during an operational state. A safety guidance module establishes a safety zone (e.g., safety zone grid) for the regular time interval based on the occupancy grid, the determined reaction distance, and the deceleration distance.

28 Claims, 9 Drawing Sheets

U.S. PATENT DOCUMENTS

| | | | | |
|---|---|---|---|---|
| 5,987,379 | A | 11/1999 | Smith | 701/207 |
| 6,268,804 | B1 * | 7/2001 | Janky et al. | 340/903 |
| 6,326,887 | B1 * | 12/2001 | Winner et al. | 340/435 |
| 6,631,324 | B2 * | 10/2003 | Okamura et al. | 701/301 |
| 6,873,251 | B2 * | 3/2005 | Schiffmann et al. | 340/436 |
| 7,142,150 | B2 * | 11/2006 | Thackray | 342/54 |
| 7,409,295 | B2 * | 8/2008 | Paradie | 701/301 |
| 2002/0082757 | A1 * | 6/2002 | Behnke | 701/50 |
| 2002/0156581 | A1 * | 10/2002 | Matsuura | 701/301 |
| 2004/0024498 | A1 * | 2/2004 | Okamura et al. | 701/1 |
| 2004/0111184 | A1 * | 6/2004 | Chiappetta et al. | 700/245 |
| 2005/0015189 | A1 * | 1/2005 | Posselius et al. | 701/50 |
| 2005/0128063 | A1 * | 6/2005 | Isaji et al. | 340/439 |
| 2005/0240335 | A1 * | 10/2005 | Schroder | 701/96 |

FOREIGN PATENT DOCUMENTS

| | | |
|---|---|---|
| GB | 2 139 036 A | 10/1984 |
| GB | 2 309 555 A | 7/1997 |

OTHER PUBLICATIONS

Thrun, S. Learning Maps for Indoor Mobile Robot Navigation [online], Sep. 1997 [retrieved on Jun. 24, 2005]. Retrieved from the Internet: <URL: http://cite.seer.ist.psu.edu/thrun98learning.html>.

Thrun, S. Learning Occupancy Grid Maps with Forward Sensor Models [online], [retrieved Jun. 24, 2005]. Retrieved from the Internet: <URL: http://robots.stanford.edu/papers/thrun.occ-journal.pdf>.

Thrun, S. Robotic Mapping: A Survey [online], Feb. 2002 [retrieved on Jun. 24, 2005]. Retrieved from the Internet: <URL: http://robots.stanford.edu/papers/thrun.mapping-tr.pdf>.

* cited by examiner

SYSTEM AND METHOD FOR PROVIDING A SAFETY ZONE ASSOCIATED WITH A VEHICLE

FIELD OF THE INVENTION

The present invention relates to a system and method for providing a safety zone associated with a vehicle.

BACKGROUND OF THE INVENTION

A vehicle may be equipped with one or more sensors to acquire position data associated with stationary or moving obstacles. However, the acquired position data does not provide a convenient or reliable procedure for determining quantitative safeguarding requirements or other defined safeguarding requirements applicable to navigation control of the vehicle. Thus, there is a need for a method and a system to facilitate determining and providing a safety zone (e.g., a dynamic safety zone) associated with vehicle.

SUMMARY OF THE INVENTION

A method and system for providing a safety zone associated with a vehicle is well suited for facilitating collision avoidance. A sensing system collects position data associated with one or more obstacles within a certain range of a vehicle. A former establishes an occupancy grid or matrix based on the collected position data. A motion monitoring module determines a reaction distance and a deceleration distance associated with a vehicle at a regular time interval during an operational state. A safety guidance module establishes a safety zone (e.g., safety zone grid) for the regular time interval based on the occupancy grid or matrix, the determined reaction distance, and the deceleration distance.

DESCRIPTION OF THE PREFERRED EMBODIMENT

Figure 1:
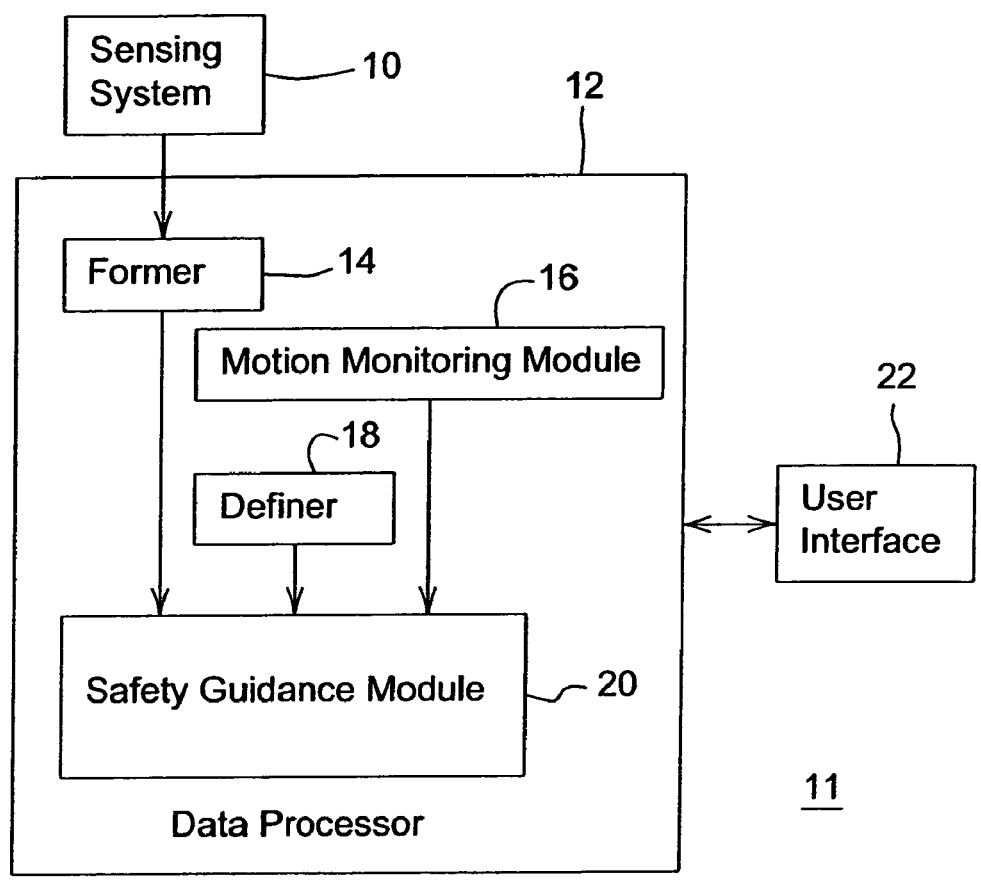
FIG. 1 is a block diagram of one embodiment of a system for providing a safety zone associated with a vehicle.

In accordance with one embodiment of the invention, FIG. 1 shows a vehicle monitoring system 11 for providing a safety zone associated with a vehicle. The safety zone provides adequate maneuvering room or spatial separation between the vehicle and one or more obstacles to prevent possible collisions with the obstacles. The vehicle monitoring system 11 comprises a sensing system 10 and a user interface 22 that communicate with a data processor 12.

The data processor 12 comprises a former 14, a motion monitoring module 16, and a definer 18 that communicate input data to a safety guidance module 20. The safety guidance module 20 may process the input data to determine output safety data (e.g., safety zone data). The user interface 22 may display or communicate the output safety data to a user or operator of the vehicle.

The sensing system 10 may comprise one or more of the following sensors: a radar transceiver, a sonar transceiver, an optical transceiver, a laser transceiver, a radar unit, a sonar unit, a ladar (i.e., laser radar) device, a scanning laser, a range finder, or any another device for determining position data (e.g., coordinates in two or three dimensions) of an obstacle or object, or a surface thereof. If the sensing system 10 includes multiple sensors, each sensor may operate within a different frequency range to improve reliability of the detection of an obstacle. For instance, the sensing system 10 may operate in the ultrasonic band, the infra-red frequency band, and the visible light band, among other possible bands (e.g., radio frequency or microwave) within the electromagnetic frequency spectrum. As used herein, an obstacle shall refer to any object that is detectable by the sensing system 10. To be detectable, the object may exceed a certain minimum threshold size and have a sufficient surface reflectivity for reliable reception by the sensing system 10 based on the particular electromagnetic frequency range, transmit power, and receive sensitivity of the sensing unit 10, among other possible factors. Further, to be detectable the obstacle must be within a certain maximum range or a coverage pattern of the sensing system 10. The sensing system 10 may gather position data on an obstacle over time to determine whether the obstacle is moving and/or to estimate the velocity or acceleration of the obstacle.

In one embodiment, the sensing system 10 transmits a transmission or transmitted pulse at a transmission time in a coverage pattern around or in front of the vehicle. If a detectable obstacle is present in the coverage pattern, the sensing system 10 may receive a reflection or reflected pulse (associated with the transmission or transmitted pulse) at a reception time. An elapsed time between the transmission time of the transmission pulse and the reception time of the reflected pulse may be used to estimate the distance or range between the obstacle and the vehicle because the elapsed time is proportional to the distance. Electromagnetic propagation generally propagates at approximately the speed of light. For example, the sensing system 10 may estimate the distance between the vehicle and the a detectable obstacle (e.g., with a surface having greater than a minimal reflectivity with respect to the transmission pulse) based on the following equation: distance=$(c*t)/2$, where $c=3\times10^8$ meters/seconds (speed of light), t=elapsed time or round trip propagation time, and distance is distance in meters.

In general, the former 14 comprises an organizer for organizing sensor readings of position data of the sensing system 10 for an associated scanning time or evaluation time interval into one or more occupancy grids or matrices. If the sensing system 10 comprise multiple sensors in a particular configuration, the former 14 may comprise an integration module, a selector, or sensor fusion module to process the sensor input data or position data collected from multiple sensors of the sensing system 10. Whereas a selector might select the most reliable sensor readings from a particular sensor for a particular time interval or apply a greater weight to such most reliable sensor readings, the sensor fusion model may integrate or combine readings from different sensors.

The motion monitoring module 16 determines a reaction distance and a deceleration distance (e.g., a stopping distance) for a vehicle for a given time interval. The deceleration distance means a minimum braking distance to reduce a vehicular velocity to substantially zero, a stopping distance for the vehicle, or a minimum braking distance to reduce vehicle velocity to some minimal target velocity. To calculate the reaction distance and deceleration distance, the motion monitoring module 16 receives or accepts input data from a speedometer, an accelerometer, a combination of an accelerometer and an integrator, a location-determining receiver (e.g., Global Positioning System receiver with differential correction), or another device for measuring the vehicular velocity or displacement of the vehicle versus time. Further, the motion monitoring module 16 may support data storage and retrieval of vehicular velocity data versus time data from a motion sensor (e.g., 32).

The definer 18 comprises software or another mechanism for defining or selecting user definable aspects associated with a safety zone or safety margin of a vehicle. In one embodiment, the definer 18 is configured to accept user input from the user interface 22 to configure one or more of the following: a safety margin area, a first safety margin area, a second safety margin area, a buffer zone, and another supplemental safety area associated with the safety zone.

The user interface 22 may comprise one or more of the following devices: a display, a keypad, a keyboard, an instrument panel, an indicator, a speaker, a transducer, a voice recognition module, and a pointing device (e.g., an electronic mouse or trackball).

Any of the arrows or lines that interconnect the components in FIG. 1 may represent physical data paths, logical data paths, or both. A physical data path may comprise a databus or a transmission line, for example. A logical data path may represent a communication or data message between software programs, software modules, subroutines, or other software constituents or components.

Figure 2:
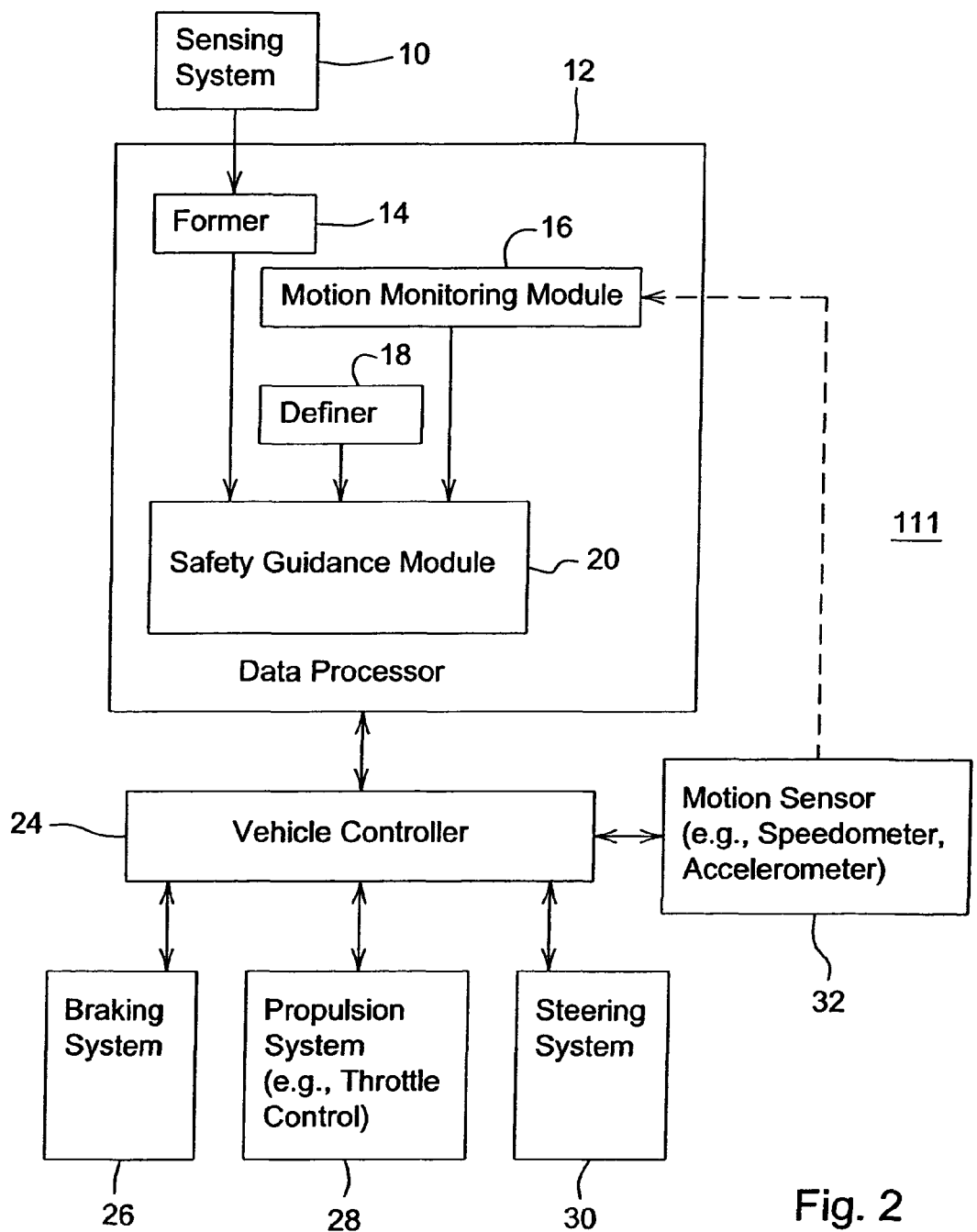
FIG. 2 is a block diagram of another embodiment of a system for providing a safety zone associated with the vehicle.

The vehicle monitoring system 111 of FIG. 2 includes the data processor 12 and the sensing system 10 of FIG. 1. Further, the system 111 of FIG. 2 comprises a vehicle controller 24 coupled to a braking system 26, a propulsion system 28, a steering system 30, and a motion sensor 32. The arrows or lines that interconnect the vehicle controller 24 with the other components may represent physical data paths, logical data paths, or both.

The safety guidance module 20 communicates the output safety data to a vehicle controller 24. The vehicle controller 24 may generate control signals for at least one of a steering system 30, a braking system 26, and a propulsion system 28. The control signals are consistent with the output safety data (e.g., safety zone or occupancy grid). The control signals may control a vehicle speed, a vehicle velocity, a maximum speed, a maximum velocity, a speed range, or a velocity range of the vehicle based on the output safety data. For example, the control signals may comprise a steering control signal or data message that is time dependent and defines a steering angle of the steering shaft; a braking control signal or data message that defines the amount of deceleration, hydraulic pressure, or braking friction applied to brakes; a propulsion control signal or data message that controls a throttle setting, a fuel flow, a fuel injection system, vehicular speed or vehicular acceleration. If the vehicle is propelled by an electric drive or motor, the propulsion control signal or data message may control electrical energy, electrical current, or electrical voltage to the electric drive or motor.

The steering system 30 may comprise an electrically controlled hydraulic steering system, an electrically driven rack-and-pinion steering, an Ackerman steering system, or another steering system. The braking system 26 may comprise an electrically controlled hydraulic braking system, or another electrically controlled friction braking system. The propulsion system 28 may comprise an internal combustion engine, an internal combustion engine-electric hybrid system, an electric drive system, or the like.

The motion sensor 32 may comprise a speedometer, an accelerometer associated with an integrator, a speed sensor, or another device for measuring a speed or velocity of the vehicle with respect to the ground or another reference point. If the safety guidance module 20 provides a maximum speed or a speed range as output to the vehicle controller 24, the motion sensor 32 provides data (e.g., feedback data) to manage maintenance of the maximum speed or speed range. For example, the vehicle controller 24 may issue various commands to braking system 26, the propulsion system 28, or both to maintain a vehicular speed at or below a maximum speed or within a speed range. In one embodiment, motion sensor 32 may communicate with the data processor 12 via the vehicle controller 24. However, in an alternate embodiment, the motion sensor may communicate directly with the data processor 12 or motion monitoring module 16, as indicated by the dashed line of FIG. 2.

Figure 3:
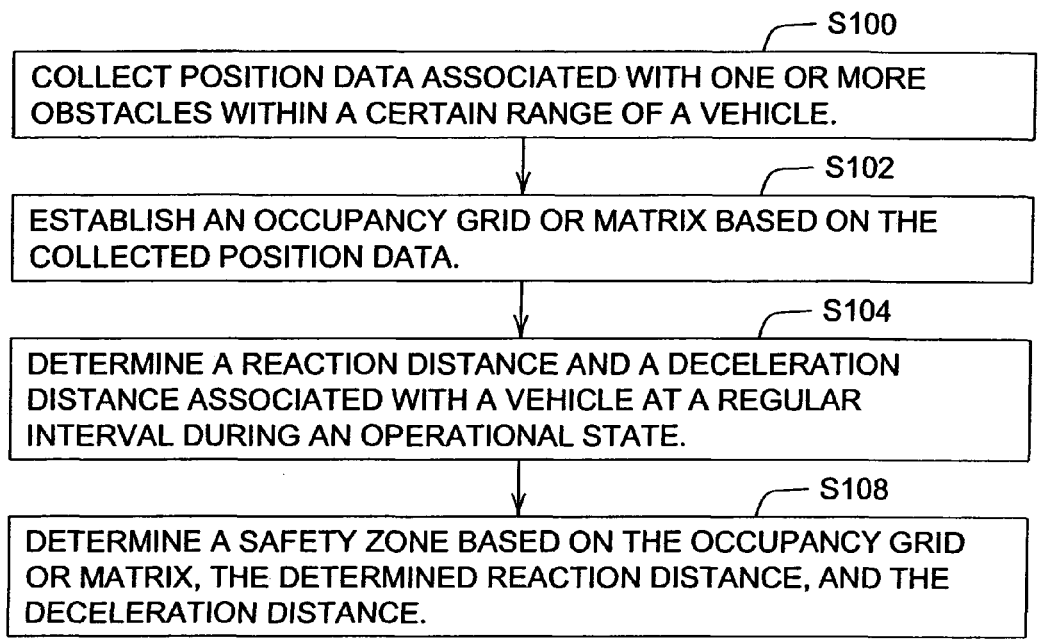
FIG. 3 is a flow chart of one embodiment of a method for providing a safety zone associated with a vehicle.

FIG. 3 shows a flow chart of a method for providing a safety zone for a vehicle. The method of FIG. 3 begins in step S100.

In step S100, a sensing system 10 collects position data (e.g., two-dimensional and three-dimensional coordinates) associated with one or more obstacles or objects within a certain range of a vehicle. For example, the sensing system 10 (e.g., sonar, ladar, or radar system) collects the position data at regular intervals (e.g., sampling periods).

In step S102, a former 14 or data processor 12 establishes an occupancy grid or matrix based on the collected position data. For example, the former 14 may select the most reliable sensor readings, or integrate or combine sensor readings from multiple sensors into an occupancy grid or a matrix in accordance with a sensor fusion algorithm or otherwise. The sensor fusion algorithm may operate in accordance with Bayes law, or a variation thereof, for instance. In accordance with Bayes rule or variation thereof, each cell of an occupancy grid may be defined as the occurrence of a first event (e.g., an obstacle is present) associated with first sensor readings and the probability of occurrence (e.g., a certain percentage chance that an obstacle is present) of a second event associated with second sensor readings. Further, the first sensor readings may define a first group or first matrix, whereas the second sensor readings may define a second group or second matrix that can be temporally and spatially aligned with the first group for formation of the occupancy grid.

In step S104, a motion monitoring module 16 or the data processor 12 determines a reaction distance and a deceleration distance associated with the vehicle at a regular interval during an operational state. The reaction distance is based on a reaction time (e.g., a constant reaction time). The reaction distance and the deceleration distance may both vary with the vehicular speed or acceleration of the vehicle at any given time.

The reaction time may include one or more of the following: (1) for manned vehicles, the reaction time may equal the sum of the driver reaction time (e.g., average reaction time of test drivers, mean reaction time of test drivers, mode reaction time of test drivers or other figures in accordance with empirical studies) and the vehicle reaction time; and (2) for unmanned or autonomous vehicles, the reaction time may equal the sum of a processor reaction time (e.g., for vehicle monitoring system 11 or 111) and a vehicle reaction time. For any vehicle regardless of whether it is manned or unmanned, the reaction time of the vehicle may consider one or more of the following: (1) the response time of the transmission shifting from gear (e.g., propulsion power applied to one or more wheels) to neutral, (2) the response time of the braking system 26 to apply a significant friction pressure or maximum effective deceleration to the rotor, drums, or other braking member at the wheels, (3) the engine response lag (e.g., revolutions per minute at the crankshaft) to throttle control input or signals, (4) processing delay of control systems, computer control systems, or databus communications of the vehicle, and (5) the mass or weight of the vehicle (e.g., including its payload and passengers). The response time of the braking system 26 may depend upon the braking power or design of the braking system 26 as well as the interaction of any wheel (of a wheeled vehicle) or tracks (of a tracked vehicle) with the ground. Although virtually any reaction time may be used to determine the reaction distance, in practice the reaction time may range from a few milliseconds to a few seconds. The deceleration distance may depend upon or may compensate for environmental conditions (e.g., wet pavement, wet grass) or vehicle conditions (e.g., bald or worn tires).

In step S108, a safety guidance module 20 or data processor 12 determines a safety zone (e.g., associated with a safety zone grid) based on the occupancy grid, the determined reaction distance, and the deceleration distance. In one example, the safety zone may comprise a generally annular zone, a generally semi-circular zone, or a generally circular zone about the vehicle. For a semi-circular zone, the zone may be limited to the direction of travel from the vehicle. An obstacle may lie on the edge of the safety zone or farther away. For instance, the edge of the safety zone may represent the closest distance in which the vehicle can stop, slow down, maneuver or avoid a collision with the obstacle given a set of vehicular handling constraints. Vehicular handling constraints include stopping distance associated with a speed or range of speeds, minimum turning radius, vehicle weight, vehicle width, vehicle size, vehicle center of gravity, vehicle stability, vehicle suspension, and vehicle suspension tuning, among other constraints.

In another example, the safety zone may represent a grid (e.g., occupancy grid), matrix or a map where the cells represent the probability that the corresponding cell or area is safe to traverse (or generally free of obstacles or objects).

In still another example, the size of the safety zone may be proportional to the speed or velocity of the vehicle over a given time period. For instance, the higher the vehicle speed, the greater the requisite area of the safety zone; the lower the vehicle speed, the lesser the requisite area of the safety zone.

Step S108 may be executed in accordance with various techniques, that may be applied cumulatively or independently. Under a first technique for executing step S108, the occupancy grid (e.g., a populated occupancy grid established in step S102) is used to establish a safety zone (e.g., for placement on the grid) for each cell. The safety zone is defined as an area around or in front of the vehicle between the vehicle and the obstacle. The extent or boundaries of the safety zone are determined based on the reaction distance, and the deceleration distance (e.g., vehicular stopping distance). The planned path or actual path of the vehicle may also influence the shape and extent of the safety zone. The vehicular reaction distance may be determined as function of vehicle speed, vehicle velocity, maximum speed, maximum velocity, actual speed, or desired speed. In accordance with the first technique, the reaction distance is equal to speed (or velocity) multiplied by the reaction time. Further, the stopping distance equals vehicle speed (or velocity) squared divided by two times the maximum deceleration.

Under a second technique for executing step S108, the safety zone may establish or be associated with a safety zone grid. For example, under the safety zone grid the probability that one or more obstacles exist in an observation region is one minus the product of the probability of emptiness of all cells in the observation region. The observation region comprises any region between obstacle and the vehicle. The observation region may have a minimum width that (1) is equal to or greater than the vehicle width or (2) is equal to or greater than the vehicle width plus a clearance margin. The observation region may have (1) a minimum depth defined by the sum of reaction distance and the deceleration distance or (2) a minimum depth defined by the sum of the reaction distance, the deceleration distance and a supplemental margin.

The cells in the observation region may be characterized by an occupancy grid in accordance with the following equation:

$P_{Test} = (1 - P_E) P_O$, where $P_{Test}$ is the probability that one or more obstacles exist at a particular cell in the observation region, where $P_E$ is the probability of emptiness of the particular cell in the observation region, and $P_O$ is the probability of occupancy of the particular cell in the observation region. Although the foregoing equation for $P_{Test}$ does not use any spatial weighting or filtering, in alternate embodiments such spatial weighting may be applied to determining the probability that one or more obstacles are in a given cell of the observation region during an evaluation interval.

Under a third technique for carrying out step S108, the safety zone dynamically expands with an increase in vehicular speed and contracts with a corresponding decrease in vehicular speed. The expansion and contraction may occur after a sensor update or sampling interval associated with sensor readings of the sensing system 10. For instance, the safety zone may be defined as a generally annular region, a generally circular region, or generally a semi-circular region about the vehicle, where the radius of the radial region allows the vehicle sufficient opportunity to avoid, evade or stop before colliding with the obstacle. In such a case, the safety zone may be formed of concentric rings or regions about the vehicle. With regards to such regions, the first region has a radial measurement associated with a reaction distance; a second region has a radial measurement associated with a deceleration distance or stopping distance, and a third region, if present, has a radial measurement defined by a user as a supplemental safety margin distance. In one embodiment, the safety margin distance is selected based on the perceived safety of an operator and/or bystanders associated with the vehicle, where such perception of safety is obtained by surveys or studies of one or more operators or bystanders, for example.

Figure 4:
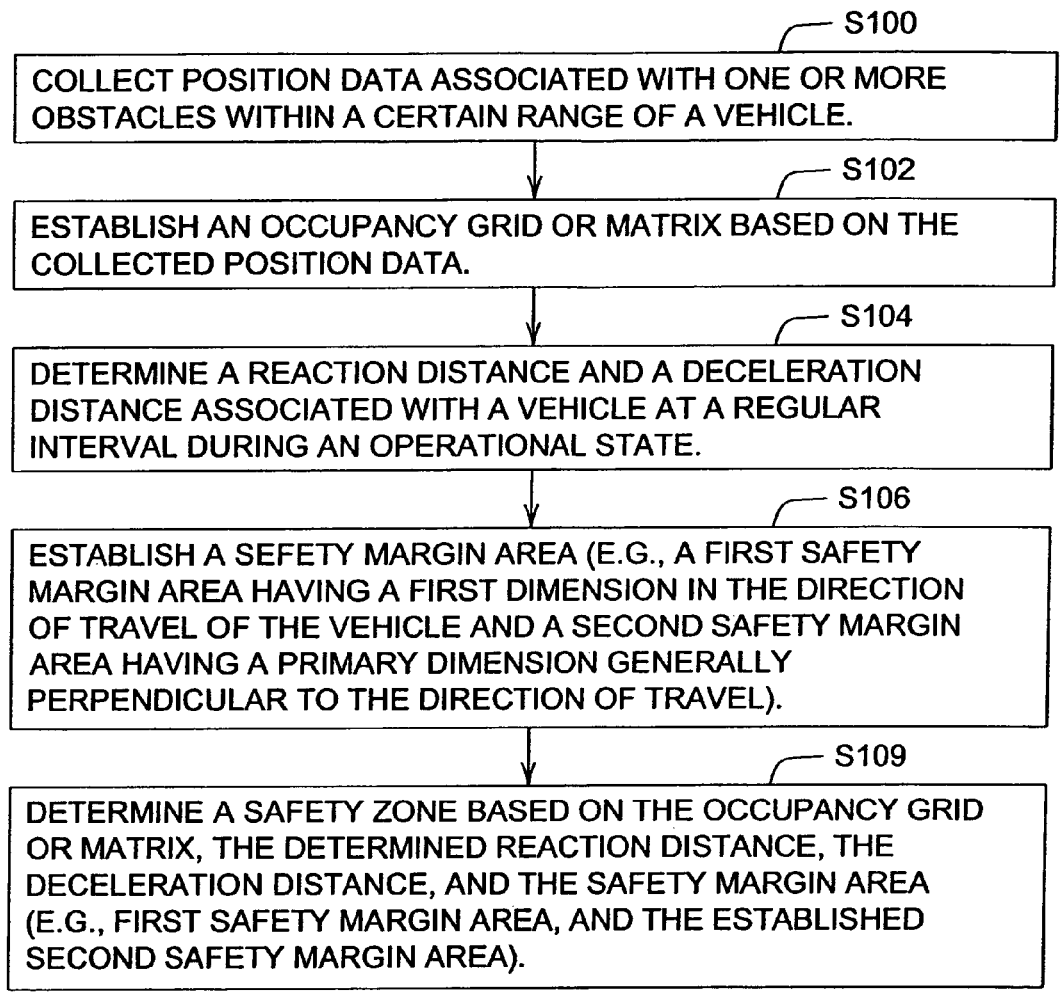
FIG. 4 is a flow chart of another embodiment of a method for providing a safety zone associated with a vehicle.

The method of FIG. 4 is similar to the method of FIG. 3, except the method of FIG. 4 further includes step S106 and replaces step S108 with step S109. Like reference numbers in FIG. 3 and FIG. 4 indicate like elements.

In step S106, a definer 18 or data processor 12 defines or establishes a safety margin area. For example, the definer 18 or data processor 12 defines or establishes a first safety margin area having a first dimension in the direction of travel of the vehicle and a second safety margin area having a primary dimension generally perpendicular to the direction of travel. The first safety margin area may represent a generally rectangular region or another region separated from the vehicle by a reaction distance plus a deceleration distance (e.g., stopping distance). The second safety margin may represent strips or lateral strips on each side of a vehicle. The first safety margin area, the second safety margin area are more conservative or restrictive safety standards than the minimum required to avoid collision with an obstacle or other safety problems. Accordingly, the first safety margin area, the second safety margin area, or both may consider information on user perception, user input, empirical studies, customer focus groups, or otherwise to provided an additional comfort level for the operator or bystanders associated with the vehicle.

In step S109, a safety guidance module 20 or data processor 12 determines a safety zone (e.g., safety zone grid) based on the occupancy grid or matrix, the determined reaction distance, the deceleration distance (e.g., stopping distance), safety margin area (e.g., the first safety margin area, and the second safety margin area). The safety zone is defined as an area around or in front of the vehicle or a region between the vehicle and the obstacle. The extent or boundaries of the safety zone are determined based on the reaction distance, the deceleration distance (e.g., vehicular stopping distance), and the safety margin area. The planned path or actual path of the vehicle may also influence the shape and extent of the safety zone. The vehicular reaction distance may be determined as function of vehicle speed, vehicle velocity, maximum speed, maximum velocity, actual speed, or desired speed. In accordance with the first technique, the reaction distance is equal to speed (or velocity) multiplied by the reaction time. Further, the stopping distance equals vehicle speed (or velocity) squared divided by two times the maximum deceleration.

Under a second technique for executing step S109, the safety zone may establish or be associated with a safety zone grid. For example, under the safety zone grid the probability that one or more obstacles exist in an observation region is one minus the product of the probability of emptiness of all cells in the observation region. The observation region comprises any region between obstacle and the vehicle. The observation region may have a minimum width that (1) is equal to or greater than the vehicle width or (2) is equal to or greater than the vehicle width plus a clearance margin. The observation region may have (1) a minimum depth defined by the sum of reaction distance and the deceleration distance or (2) a minimum depth defined by the sum of the reaction distance, the deceleration distance and a supplemental margin.

The cells in the observation region may be characterized by an occupancy grid in accordance with the following equation:

$P_{Test} = (1 - P_E) P_O$, where $P_{Test}$ is the probability that one or more obstacles exist at a particular cell in the observation region, where $P_E$ is the probability of emptiness of the particular cell in the observation region, and $P_O$ is the probability of occupancy of the particular cell in the observation region. Although the foregoing equation for $P_{Test}$ does not use any spatial weighting or filtering, in alternate embodiments such spatial weighting may be applied to determining the probability that one or more obstacles are in a given cell of the observation region during an evaluation interval.

Under a third technique for carrying out step S109, the safety zone dynamically expands with an increase in vehicular speed and contracts with a corresponding decrease in vehicular speed. The expansion and contraction may occur after a sensor update or sampling interval associated with sensor readings of the sensing system 10. For instance, the safety zone may be defined as a generally radial region, a generally circular region, or generally a semi-circular region about the vehicle, where the radius of the radial region allows the vehicle sufficient opportunity to avoid, evade or stop before colliding with the obstacle. In such a case, the safety zone may be formed of concentric rings or regions about the vehicle. With regards to such regions, the first region has a radial measurement associated with a reaction distance; a second region has a radial measurement associated with a deceleration distance or stopping distance, and a third region, if present, has a radial measurement defined by a user as a supplemental safety margin distance. In one embodiment, the safety margin distance is selected based on the perceived safety of an operator and/or bystanders associated with the vehicle, where such perception of safety is obtained by surveys or studies of one or more operators or bystanders, for example.

Figure 5:
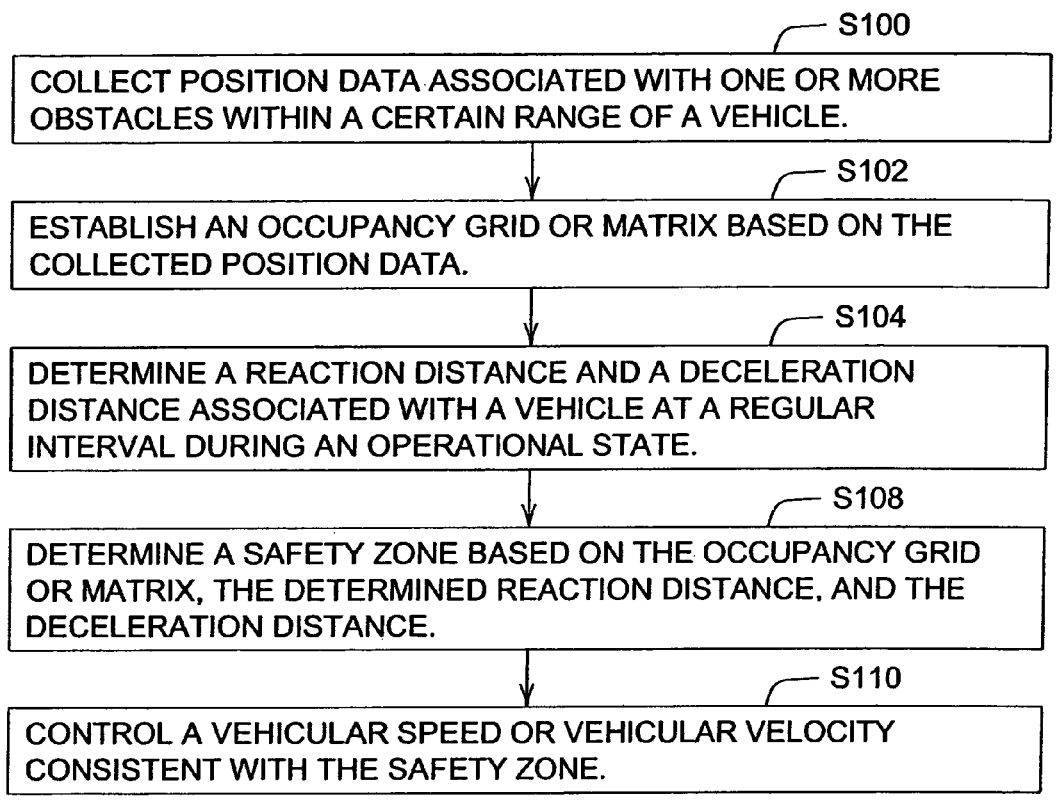
FIG. 5 is a flow chart of another embodiment of a method for providing a safety zone associated with a vehicle.

The method of FIG. 5 is similar to the method of FIG. 3, except the method of FIG. 5 further includes step S110. Like reference numbers in FIG. 3 and FIG. 5 indicate like steps or procedures. Step S110 may be carried out after step S108.

In step S110, a vehicle controller 24 controls a vehicular speed or vehicular velocity consistent with the safety zone (e.g., safety grid or occupancy grid). The sensing system 10 collects sensor data at regular intervals to update (e.g., redefine) the safety zone (e.g., occupancy grid). In one configuration, the vehicle controller 24 determines whether or not cells within its path are traversable safely at the current vehicular speed, the current velocity, or at the current velocity and current acceleration without violating any safety zone associated with the vehicle. If the cells within its path are not traversable safely at the current vehicular speed, vehicular velocity, or at the current velocity and acceleration, then the vehicular controller sends a control signal to slow down or reduce the current velocity of the vehicle, or alerts the vehicle operator to do the same via a user interface 22 (e.g., display, audible alert, transducer, or otherwise). However, if the cells within the vehicular path are traversable at the current speed, velocity, or at the current velocity and acceleration, the vehicle controller 24 allows the vehicle to maintain its present speed or to increase its present speed or accelerate within a defined maximum amount until the next safety zone (e.g., occupancy grid).

In an alternate embodiment, the safety zone may be augmented or expanded to include a safety margin area. The safety margin area provides additional clearance or maneuverability for the vehicle to avoid problems. Although the method is well suited for providing smooth or gradual adjustments to the controlled speed of a vehicle based on sensor data, the method may be applied to institute abrupt stops or deceleration to avoid collisions between the vehicle and the obstacle.

Figure 6:
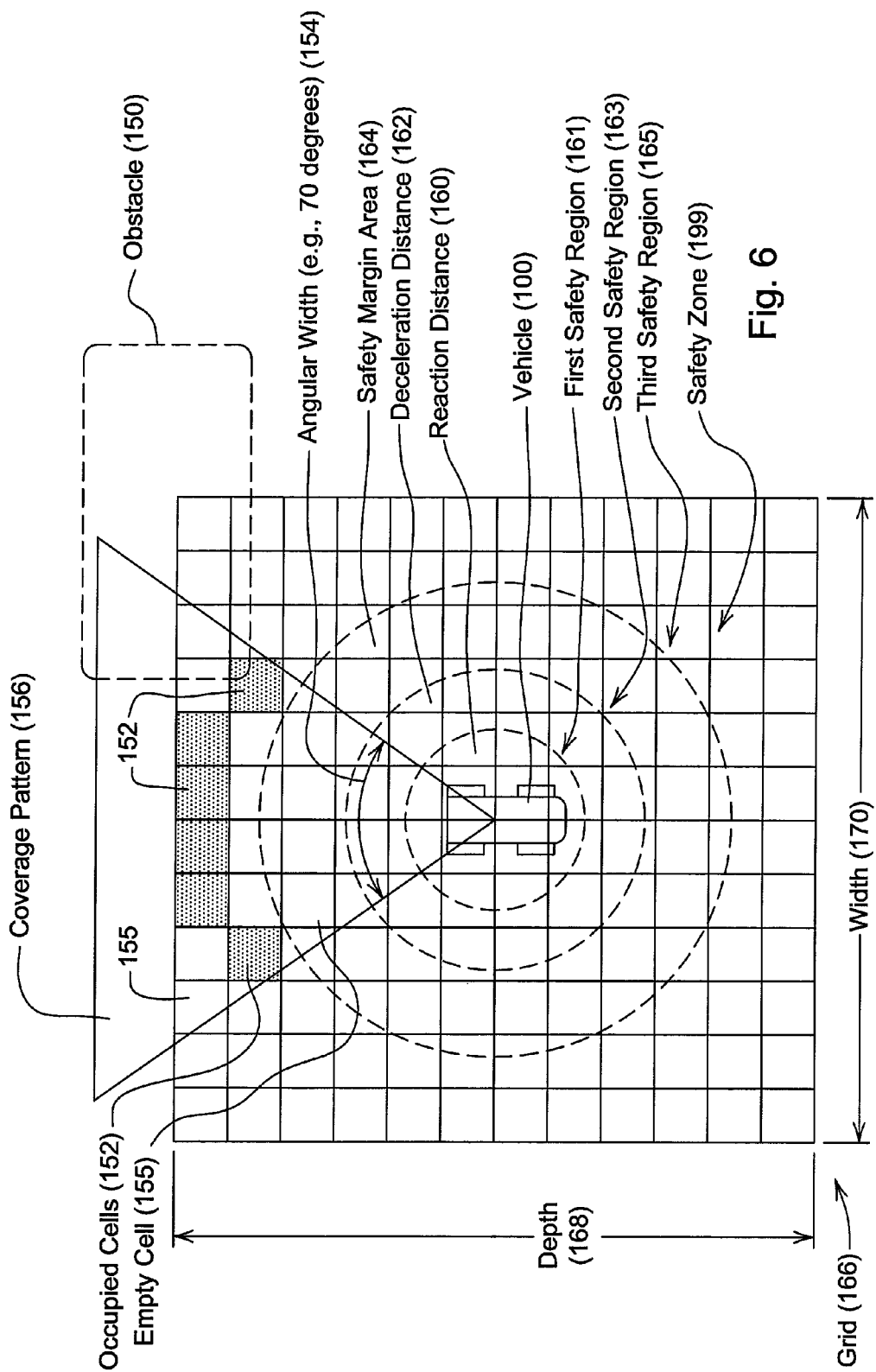
FIG. 6 is a plan view of a vehicle associated with an occupancy grid.

FIG. 6 is a plan view of a vehicle 100 associated with an occupancy grid 166. The occupancy grid 166 may be used to construct or form a safety zone 199 for operation of the vehicle 100, as discussed in conjunction with S108 of FIG. 3 or S109 of FIG. 4, for example. The occupancy grid 166 may be divided into a number of two or three dimensional cells. For two dimensional cells 198, each cell may have a generally equal width and depth, for example. The occupancy grid 166 has a depth 168 and a width 170.

The sensing system 10 has a sensor radiation pattern or coverage pattern 156. Although the coverage pattern 156 is illustrated as generally fan-shaped, conical, or triangular; other coverage patterns are possible. The coverage pattern 156 may have a radiation angle width 154 (e.g., approximately 70 degrees as shown). Occupied cells 152 and empty cells 155 lie within the boundaries of the coverage pattern 156. The occupied cells 152 are shaded or stippled. The occupied cells 152 indicate the presence of an obstacle 150 in the hatched cell at time associated with the most recent scanning, sampling time or collection of position data by the sensing system 10.

The sensing system 10 or a sensor of the sensing system 10 may determine its perceived probability of occupancy in accordance with the following equation: $L_t = [\log(S_{t-1} \times P_t / ((1-S_{t-1}) \times (1-P_t)))] - \log P_{prior}$, where $L_t$ is the log probability of a cell in the grid being occupied by an obstacle at time t, $S_{t-1}$, is the state or probability of occupancy before update at time t−1, which may be limited to a value between 0 and 1, Pt is the probability of occupancy of a cell at time t, and $\log P_{prior}$ is the log prior probability for the grid map, where $\log P_{prior} = \log P_{Background}/(1-P_{Background})$ and where $P_{background}$ is the average number or background number of occupied cells 152 out of the total available number of cells in the occupancy grid 166.

Here, the safety zone 199 may be defined as a group of generally annular regions (e.g., generally concentric annular regions 161, 163 and 165) about the vehicle 100, where the maximum radius of the generally annular regions allows the vehicle 100 sufficient opportunity to avoid, evade or stop before colliding with the obstacle. With regards to such regions, the first safety region 161 has a radial measurement associated with a reaction distance 160; a second safety region 163 has a radial measurement associated with a deceleration distance 162 (e.g., stopping distance), and a third region 165, if present, has a radial measurement defined by a user as a supplemental safety margin distance 164. In one embodiment, the safety margin distance is selected based on a safety perception of at least one of an operator of the vehicle and a bystander.

Figure 7:
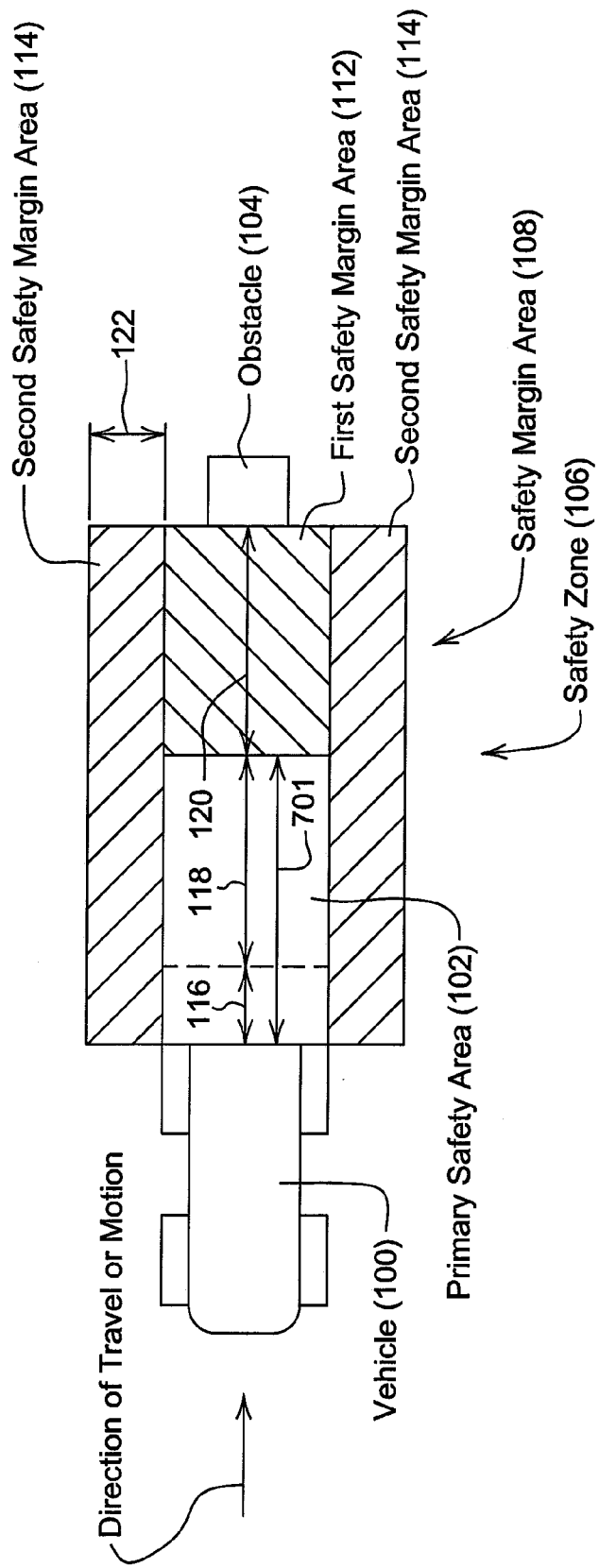
FIG. 7 is a top view of a safety zone associated with a vehicle that follows or plans to follow a generally linear segment or straight path segment.

FIG. 7 is a plan view of a vehicle 100 that follows a generally straight or generally linear path, or a generally linear segment of an overall path. The vehicle 100 is associated with a safety zone 106. Although the safety zone 106 comprises a primary safety area 102 and a safety margin area 108 as illustrated in FIG. 7, in another embodiment the safety zone 106 merely comprises the primary safety area 102.

If the safety margin area 108 is present, the safety margin area 108 represents a secondary safety area or supplemental safety area. As shown in FIG. 7, the safety margin area 108 comprises a first safety margin area 112 and a second safety margin area 114. The first safety margin area 112 is associated with a first dimension or safety margin distance 120 that is generally parallel to or coextensive with the direction of travel of the vehicle 100, whereas a second dimension depends upon a width of the vehicle. The first dimension may be referred to as an along-track margin of safety.

The first dimension (of the first safety margin area 112) or along-track margin of safety defines a distance or length along the direction of travel or motion of the vehicle 100. The first dimension may be defined by the operator, on behalf of the user, or may be application specific. In one illustrative configuration, the first dimension (of the first safety margin area 112) or first safety margin distance may be determined by a user's tolerance or subjective perception or risk while driving or being a passenger in a vehicle to people, animals, and property. For instance, the vehicle controller 24 or data processor 12 may restrict the vehicle from driving toward a obstacle more than 2 meters.

The second safety margin area 114 is associated with a primary dimension that is generally perpendicular to the direction of travel of the vehicle 100. A secondary dimension is associated with the second safety margin area 114 and is generally parallel to the direction of travel of the vehicle. The secondary dimension may have a maximum distance that extends, from the front of the vehicle 100 to an edge of the obstacle 104.

The cross-track margin or safety or the second safety margin area 114 may comprise strips that are associated with lateral areas adjacent to the primary safety area 102 and the first safety margin area 112. Although the cross-track margin may be used to define any suitable width of the primary safety area 102, in one example, the cross-track margin may define a width of the primary safety area 102 as the maximum vehicle width plus two times the cross-track safety distance. The cross-track safety distance accounts for vehicles traversing a generally perpendicular path to the vehicle. The cross-track margin of safety may be defined by the operator, on behalf of the user, or may be application specific.

In one illustrative configuration, the cross-track margin of safety may be determined by a user's tolerance or subjective perception or risk while driving or being a passenger in a vehicle to people, animals, and property. For instance, the vehicle controller 24 or data processor 12 may restrict the vehicle from driving toward a obstacle more than 50 meters along side of an obstacle.

As shown in FIG. 7, the safety zone 106, the primary safety area 102, and the safety margin area 108 are generally rectangular where the path of travel of the vehicle is generally linear or follows a generally linear segment. However, none of the safety zone 106, the primary safety area 102, and the safety margin area 108, need be rectangular in shape and each may have any suitable shape. Each suitable shape may be defined by a boundary that includes a minimum distance the vehicle is required to maintain or stay away from unsafe cells, occupied cells, or obstacles, for instance.

The primary safety area 102 has a first boundary 701 from the vehicle that is defined by sum of a reaction distance 116 and deceleration distance 118 (e.g., braking or stopping distance) of the vehicle 100. The first boundary 701 of the primary safety area 102 defines a boundary that the vehicle would barely reach if the vehicle were commanded to stop at any given point in time. The other boundaries (e.g., lateral boundaries) of the primary safety area 102 may be determined by the physical width of the vehicle 100.

The primary safety area 102 includes the total distance (with respect to the ground) covered during the vehicle reaction time plus the distance covered during maximum deceleration until a full stop of the vehicle. For instance, a first boundary 701 or edge of the first safety area 102 is the sum of the reaction distance ($d_A$) and a deceleration distance ($d_B$) in accordance with the following set of equations:

$d_A = v_A \times t_R$, where $v_A$ is current vehicular velocity and $t_R$ is reaction time;

$d_B = v_A^2 / 2a_B$, where $v_A$ is current vehicular velocity, and $a_B$ is the maximum deceleration rate. The current vehicular velocity may be obtained from a speedometer, an accelerometer or another sensor associated with the vehicle 100. The reaction time and deceleration rate may be measured by actual laboratory or field tests, or estimated based on specifications of the vehicle, for example. The safety zone 106, the primary safety area 102, and the safety margin area 108 may be updated with the collection of sensor data from the sensing system 10 at regular intervals.

In an alternate embodiment, the value of $d_A$, $d_B$ or both may be adjusted not only to avoid collision, but to extend more conservatively to the perception or appearance of unsafe operation from the perspective of the operator of the vehicle, a bystander, or both. For instance, the vehicle may be restricted from approaching closer to some minimum distance to a bystander, an animal, or some obstruction.

In still another embodiment, the value of $d_A$, $d_B$ or both may be adjusted not only to avoid collision, but to extend more conservatively to accommodate for errors in tolerance, sensor resolution, machine response, or both. For instance, the vehicle may be restricted from approaching closer to some minimum distance to a bystander, an animal, or some obstruction.

Here, in FIG. 7, the along-track margin of safety is defined by a first safety margin area 112 and the cross-track margin of safety is defined by a second safety margin area 114.

Figure 8:
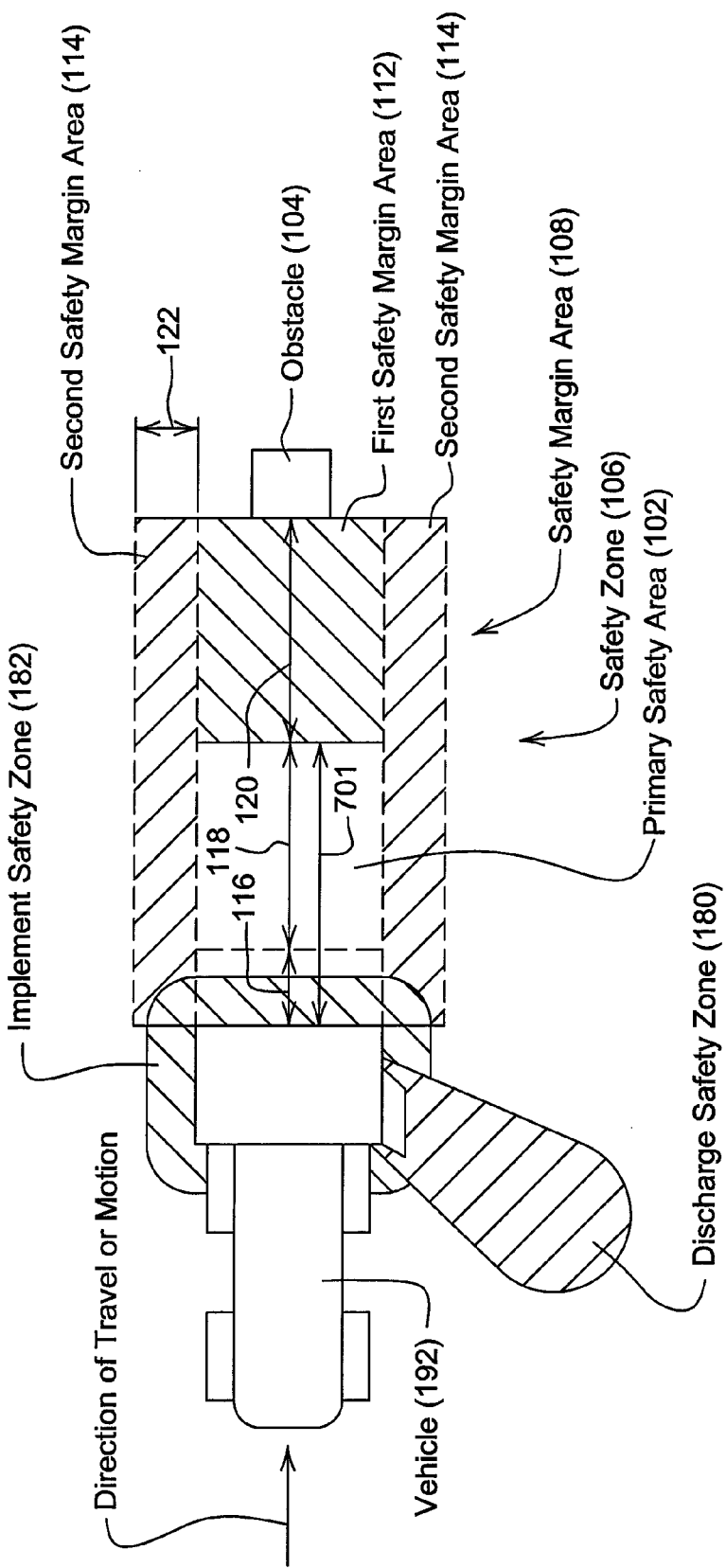
FIG. 8 is a top view of a safety zone, an implement safety zone and a discharge safety zone associated with the vehicle.

The safety zone 106, the primary safety area 102, and the safety margin area 108 of FIG. 8 are similar to those of FIG. 7, except the vehicle 192 of FIG. 8 further includes a implement safety zone 182 and a discharge safety zone 180. Like reference numbers in FIG. 7 and FIG. 8 indicate like elements.

An implement safety zone 182 comprises a region that surrounds an implement associated with the vehicle 192. An implement may comprise a harvesting head, a mower, a plow, a scraper, a planter, a cutter, a harvester, a sprayer, or otherwise. For instance, the implement safety zone 182 may extend frontward from an implement and along one or more sides of an implement. A discharge safety zone 180 comprises a region that is associated with the discharge of material (e.g., grain or harvested crop) when the implement is engaged or active. The discharge safety zone 180 may extend about a discharge chamber or chute of a vehicle to prevent the discharged material from striking or contacting a person, animal or any unintended target.

Figure 9:
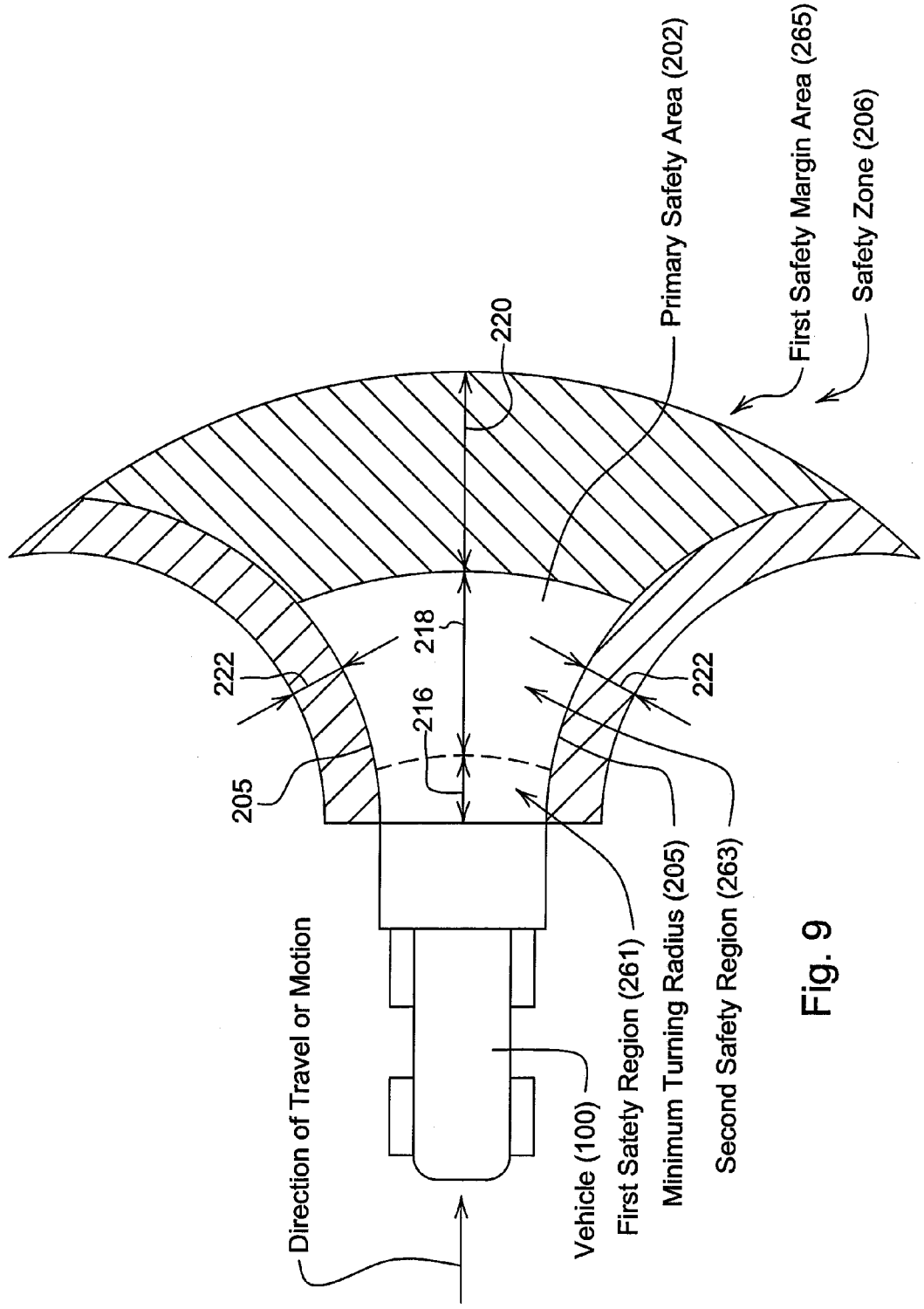
FIG. 9 is a top view of a safety zone associated with the vehicle that may take any navigable route in a frontward direction.

FIG. 9 shows a top view of a vehicle 100 with a safety zone 206 (e.g., a front safety zone). The safety zone 206 of FIG. 9 covers a broad context of potential motion of the vehicle 100 because the possible path of the vehicle is uncertain or subject to change. The safety zone 206 may consider all navigable or feasible paths of the vehicle 100. The navigable paths may depend upon the minimum turning radius 205 and associated speed or velocity of vehicle (e.g., to avoid tipping, roll-over, or stability problems). The navigable paths may evaluate all paths within the mechanical limits of the steering mechanism of the vehicle, for instance. The safety zone 206 of FIG. 9 may come into play when the vehicle 100 is being manned or operated by an operator that may steer the vehicle in any direction.

The illustration of FIG. 9 differs from that of FIG. 7 in the safety zone 106 of FIG. 7 is based on a generally linear path of the vehicle, whereas the safety zone 206 of FIG. 9 is based on a straight, curved or generally unknown possible vehicular path. The safety zone 206 comprises a first safety region 261 with a first curved boundary or arc defined by a reaction distance 216, a second safety region 263 with a second curved boundary or arc defined by a deceleration distance 218, a first safety margin area 265 with a third curved boundary or arc defined by a safety margin distance 220, and a second safety margin area 222. The first safety region 261 and the second safety region 263 collectively comprise the primary safety area 202. The first safety region 261 and the second safety region 263 are flanked by a second safety margin area 222.

The same equations apply to the boundaries of the safety zones in FIG. 7 and safety zones or regions of FIG. 9. The second safety region 263 has a boundary from the vehicle that is defined by a reaction time and deceleration distance (e.g., braking distance) of the vehicle. For instance, a boundary or edge of the primary safety area 202 is the sum of the reaction distance ($d_A$) and a deceleration distance ($d_B$) in accordance with the following set of equations:

$d_A = v_A \times t_R$, where $v_A$ is current vehicular velocity and $t_R$ is reaction time;

$d_B = v_A^2/2a_B$, where $v_A$ is current vehicular velocity, and $a_B$ is the maximum deceleration rate.

The method and system of the invention facilitates the safe operation of autonomous vehicles, unmanned vehicles, or manned vehicles. The sensor data is interpreted to determine the relevancy of current and planned motion of the vehicle with to obstacles in the environment. The interpretation may consider one or more of the following guidance factors: the relative location of the obstacle with respect to the vehicle, the velocity of the vehicle, the reaction time of the vehicle (the operator, or both), and the maximum braking or deceleration of the vehicle. The vehicle operator is warned or the vehicle is controlled based on the guidance factors to minimize the risk or probability of a collision or near-collision event.

Having described the preferred embodiment, it will become apparent that various modifications can be made without departing from the scope of the invention as defined in the accompanying claims.

The following is claimed:

1. A method for operating a vehicle carrying at least one implement, the method comprising:
   collecting, by a sensing system, position data associated with one or more obstacles within a range of a vehicle;
   determining, by a data processor, a reaction distance and a deceleration distance associated with a vehicle at a regular time interval during an operational state, the reaction distance based on a reaction time;
   determining, by the data processor, a safety zone for said vehicle based on the position data, the determined reaction distance, and the deceleration distance;
   determining, by a data processor, an implement safety zone comprising a region surrounding at least one implement attached to the vehicle; and
   controlling, by a vehicle controller, said vehicle consistent with the safety zone and the implement safety zone.

2. The method according to claim 1 further comprising:
   establishing, by the data processor, a first safety margin distance in a direction of travel of the vehicle, and wherein:
   the safety zone is determined based on an occupancy grid or matrix based on the position data, the reaction distance, the deceleration distance, and the first safety margin distance.

3. The method according to claim 1 further comprising:
   establishing, by the data processor, a first safety margin area having a first dimension in the direction of travel of the vehicle and a second safety margin area associated with lateral areas adjacent to the first safety margin area, the second safety margin area having a primary dimension generally perpendicular to the direction of travel; and wherein:
   the safety zone is determined based on an occupancy grid or matrix based on the position data, the determined reaction distance, the deceleration distance, and the first dimension of the first safety margin area.

4. The method according to claim 1 further comprising:
   controlling, by the vehicle controller, a vehicular speed or vehicular velocity consistent with the safety zone and the implement safety zone.

5. The method according to claim 1 further comprising:
   limiting, by the vehicle controller, a vehicular speed or vehicular velocity to a maximum speed consistent with a size of a safety zone such that the vehicle is capable of stopping or avoiding a collision with said one or more obstacles.

6. The method according to claim 1 further comprising:
   defining, by the data processor, a boundary of the safety zone by the sum of the reaction distance ($d_A$) and the deceleration distance ($d_B$) in accordance with the following set of equations:

$d_A = v_A \times t_R$, where $v_A$ is current vehicular velocity and $t_R$ is reaction time;

$d_B = (v_A)^2/2a_B$, where $v_A$ is current vehicular velocity, and $a_B$ is the maximum deceleration rate.

7. The method according to claim 1 wherein the safety zone comprises a first generally annular region having a first radial dimension associated with a reaction distance, and a second generally annular region having a second radial dimension associated with a deceleration distance, wherein the first and second radial dimensions are defined about the vehicle in a plan view thereof.

8. The method according to claim 7 wherein the safety zone further comprises a third generally annular region having a radial dimension associated with a safety margin distance, wherein the radial dimension of the third generally annular region is defined about the vehicle in a plan view thereof.

9. The method according to claim 1 wherein the safety zone comprises a primary safety area having a generally rectangular shape with a first boundary defined by a sum of the reaction distance and the deceleration distance.

10. The method according to claim 1 wherein the safety zone comprises a primary safety area bounded by a minimum turning radius of the vehicle and an arc boundary defined by a sum of the reaction distance and the deceleration distance.

11. The method according to claim 1, further comprising determining, by the data processor, a discharge safety zone comprising a region associated with discharge of material when said at least one implement is engaged or active.

12. The method according to claim 11, wherein the discharge safety zone extends about a discharge chamber or chute associated with the vehicle to prevent discharged material from striking or contacting a person, animal or other unintended target.

13. The method according to claim 1, wherein the at least one implement comprises one or more of a harvesting head, a mower, a plow, a scraper, a planter, a cutter, a harvester and a sprayer.

14. The method according to claim 1, wherein collecting position data associated with one or more obstacles within a range of a vehicle comprises collecting, by the sensing system, position data of the one or more obstacles in at least two dimensions.

15. A system for providing a safety zone associated with a vehicle carrying at least one implement, the system comprising:
a sensing system for collecting position data associated with one or more obstacles within a range of a vehicle;
a motion monitoring module for determining a reaction distance and a deceleration distance associated with a vehicle at a regular time interval during an operational state, the reaction distance based on a reaction time;
a safety guidance module for:
determining a safety zone for said vehicle based on the position data, the determined reaction distance, and the deceleration distance, and
determining an implement safety zone comprising a region surrounding at least one implement attached to the vehicle; and
a vehicle controller for controlling the vehicle consistent with the safety zone and the implement safety zone.

16. The system according to claim 15 further comprising:
a definer for establishing a first safety margin distance in a direction of travel of the vehicle, and wherein the safety guidance module is arranged to determine the safety zone based on an occupancy grid or matrix based on the position data, the reaction distance, the deceleration distance, and the first safety margin distance.

17. The system according to claim 15 further comprising:
a definer for establishing a first safety margin area having a first dimension in the direction of travel of the vehicle and a second safety margin area associated with lateral areas adjacent to the first safety margin area, the second safety margin area having a primary dimension generally perpendicular to the direction of travel; and wherein:
the safety guidance module is arranged to determine the safety zone based on an occupancy grid or matrix based on the position data, the determining reaction distance, the deceleration distance, and the first dimension of the first safety margin area.

18. The system according to claim 15, further comprising:
a vehicle controller for controlling a vehicular speed or vehicular velocity consistent with the safety zone and the implement safety zone.

19. The system according to claim 15 further comprising:
a vehicle controller for limiting a vehicular speed or vehicular velocity to a maximum velocity such that the vehicle is capable of stopping or avoiding a collision with said one or more obstacles.

20. The system according to claim 15 further comprising:
a safety guidance module for defining a boundary of the safety zone by the sum of the reaction distance ($d_A$) and the deceleration distance ($d_B$) in accordance with the following set of equations:
$d_A = v_A \times t_R$, where $v_A$ is current vehicular velocity and $t_R$ is reaction time;
$d_B = (v_A)^2 / 2a_B$, where $v_A$ is current vehicular velocity, and $a_B$ is the maximum deceleration rate.

21. The system according to claim 15 wherein the safety zone comprises a first generally annular region having a first radial dimension associated with a reaction distance, and a second generally annular region having a second radial dimension associated with a deceleration distance, wherein the first and second radial dimensions are defined about the vehicle in a plan view thereof.

22. The system according to claim 21 wherein the safety zone further comprises a third generally annular region having a radial dimension associated with a safety margin distance, wherein the radial dimension of the third generally annular region is defined about the vehicle in a plan view thereof.

23. The system according to claim 15 wherein the safety zone comprises a primary safety area having a generally rectangular shape with a first boundary defined by a sum of the reaction distance and the deceleration distance.

24. The system according to claim 15 wherein the safety zone comprises a primary safety area bounded by a minimum turning radius of the vehicle and an arc boundary defined by a sum of the reaction distance and the deceleration distance.

25. The system according to claim 15, wherein the safety guidance module further determines a discharge safety zone comprising a region associated with discharge of material when said at least one implement is engaged or active.

26. The system according to claim 25, wherein the discharge safety zone extends about a discharge chamber or chute associated with the vehicle to prevent discharged material from striking or contacting a person, animal or other unintended target.

27. The system according to claim 15, wherein the at least one implement comprises one or more of a harvesting head, a mower, a plow, a scraper, a planter, a cutter, a harvester and a sprayer.

28. The system according to claim 15, wherein the position data associated with the one or more obstacles comprises position data of the one or more obstacles in at least two dimensions.

* * * * *